April 22, 1947.  E. BEST  2,419,331
TRACTOR GRAPE HOE
Filed Dec. 28, 1943  2 Sheets-Sheet 1

INVENTOR.
Ernest Best
BY
Fred G. Matheny
ATTORNEY

April 22, 1947.  E. BEST  2,419,331
TRACTOR GRAPE HOE
Filed Dec. 28, 1943  2 Sheets-Sheet 2
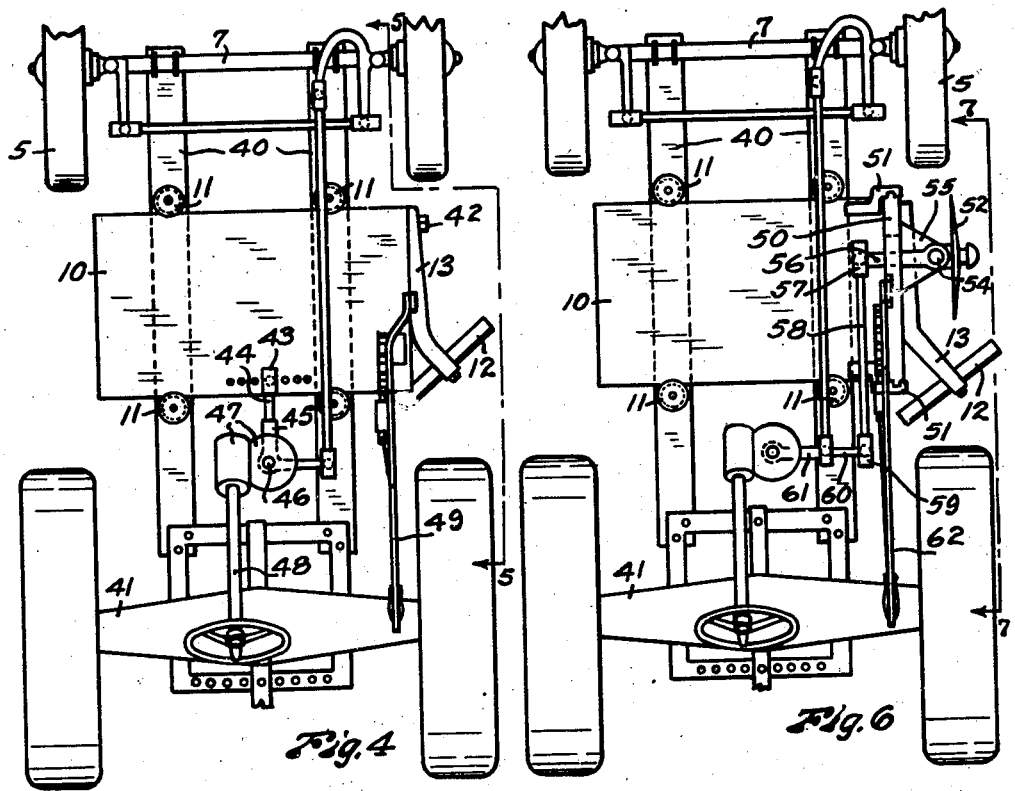
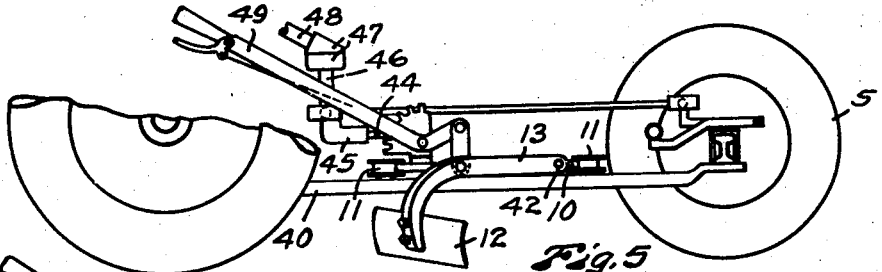
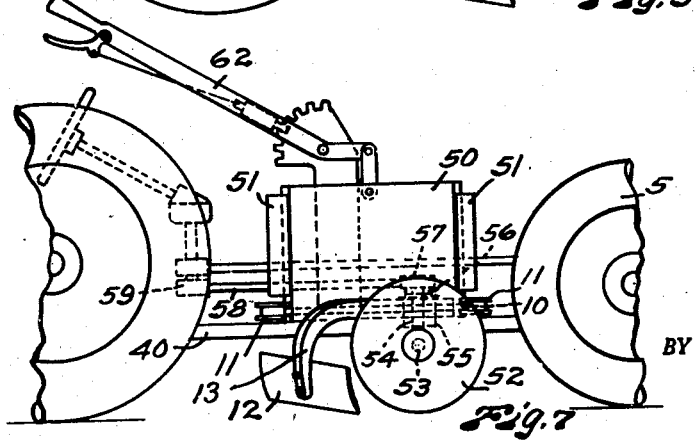
INVENTOR.
Ernest Best
BY Fred G. Mathews
ATTORNEY Patented Apr. 22, 1947

2,419,331

UNITED STATES PATENT OFFICE 2,419,331

TRACTOR GRAPE HOE

Ernest Best, Fredonia, N. Y.

Application December 28, 1943, Serial No. 516,126

12 Claims. (Cl. 97—137)

My invention relates to a tractor propelled grape hoe which is especially useful in the cultivation of grapes but is not limited to that work and may be used in the cultivation of other crops, it being understood that the term "grape hoe" is herein used as a descriptive rather than a limiting term.

A general object of my invention is to provide a simple and efficient grape hoe that is attached to a tractor and steered or controlled from the tractor in such a manner as to cultivate the ground and uproot, sever or cover the weeds in and around the grape vines in a row without damaging the vines or coming in contact with the trellises on which the grape vines are supported.

Another object is to provide a tractor propelled grape hoe having a soil cultivating blade that is connected with the steering mechanism of the tractor in such a manner that the blade may be guided in its work by manipulation of the tractor steering mechanism.

Another object is to provide a tractor propelled grape hoe having a soil cultivating blade and having a rotatably mounted cutter disc that runs in the ground as the hoe moves forwardly, said cutter disc being guided by the steering mechanism of the tractor and being connected with the soil cultivating blade so that said disc, in turn, guides the soil cultivating blade with a minimum of effort on the part of the operator.

Other objects of the invention will be apparent from the following description taken in connection with the accompanying drawings.

In the drawings:

Fig. 4 is a fragmentary plan view showing my grape hoe installed between the front and rear wheels of a tractor and directly connected with the tractor steering means, parts of the tractor being omitted.

Fig. 5 is a fragmentary side elevation of the devices shown in Fig. 4, looking in the direction indicated by line 5—5 of Fig. 4.

Fig. 6 is a fragmentary plan view showing my grape hoe installed between the front and rear wheels of a tractor and indirectly connected with the tractor steering means through a rotatable disc that operates in the ground and cooperates in guiding the grape hoe, parts of the tractor being omitted.

Fig. 7 is a fragmentary side elevation of the devices shown in Fig. 6 looking in the direction indicated by line 7—7 of Fig. 6.

Fig. 8 is a detached plan view of a steering arm of the type used in the tractor and grape hoe shown in Figs. 6 and 7.

Like reference numerals designate like parts throughout the several views.

Figure 1:
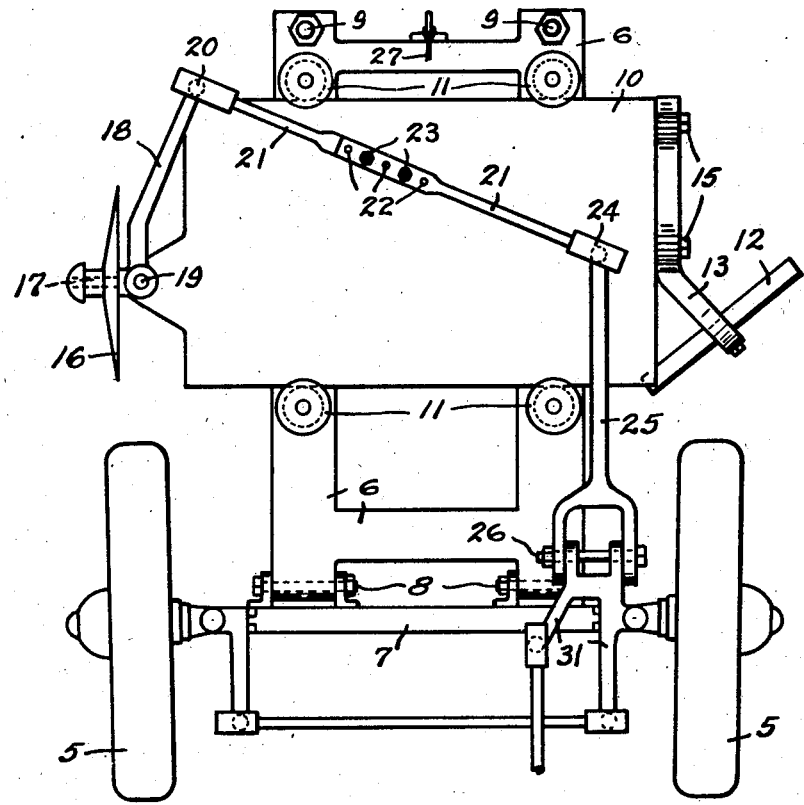
Fig. 1 is a plan view of a tractor propelled grape hoe constructed in accordance with my invention, showing the same positioned in front of a tractor and operatively connected with the tractor, only the front wheels and front axle and parts of the tractor steering mechanism being shown.
Figure 3:
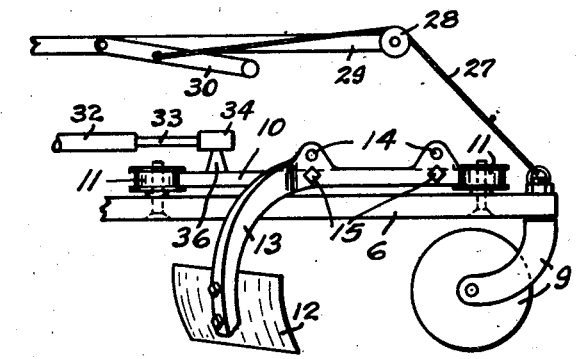
Fig. 3 is a side elevation of this grape hoe, with parts broken away and showing blade guiding means of the type shown in Fig. 2.
Figure 2:
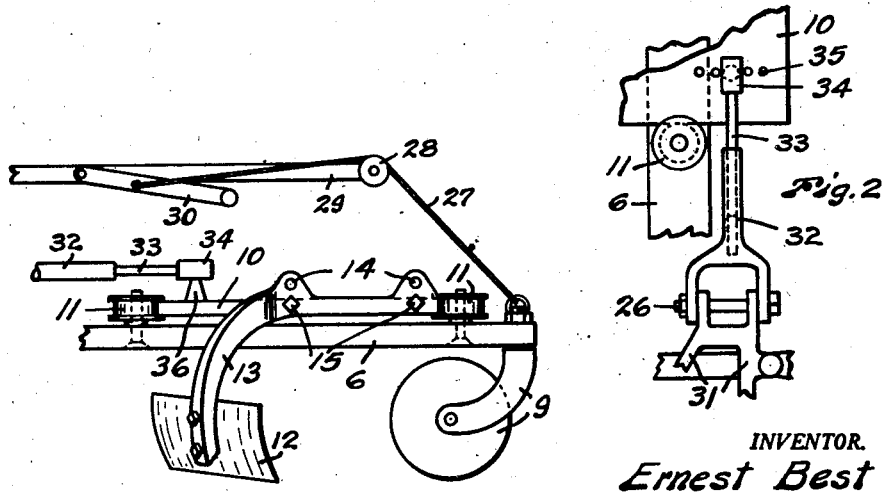
Fig. 2 is a fragmentary plan view showing blade guiding means of modified form for use in connection with the grape hoe shown in Fig. 1.

The grape hoe shown in Figs. 1 to 3 comprises a lower main frame 6 having its rear end portion connected with the front axle 7 of a tractor by normally horizontal pivot means 8. The pivots 8 are substantially parallel with the tractor axle 7. Front tractor wheels 5 support the tractor axle 7 in the usual manner. The front end portion of the frame 6 is supported by one or more caster wheels 9 when the hoe is in operation. Preferably two of these caster wheels 9 are provided.

A blade carrying platform or frame 10 is supported from the main frame 6 by rollers or sheaves 11. This blade carrying frame 10 is thus floatingly mounted so that it is movable back and forth in directions at substantially right angles to the longitudinal axis of the tractor, that is, at right angles to the direction in which the tractor moves when the device is in operation.

A soil cultivating blade 12 is secured, preferably by a beam or curved arm 13, to the blade carrying frame 10. Preferably the arm 13 is adjustable vertically on the frame 10 to vary the depth of cut of the blade 12. This may be done by providing a plurality of vertically spaced holes 14, Fig. 3, for the reception of readily removable bolts or cap screws 15 by which the arm 13 is secured to the frame 10. Obviously the shape of the blade 12 and the arm 13 may be varied as required by different operations and operating conditions.

In the type of grape hoe shown in Fig. 1 I provide what I term indirect means for guiding the blade 12. This indirect means comprises a disc 16 of rolling cutter type positioned at the opposite side of the frame 10 from the blade 12 and mounted for rotation on a normally horizontal bearing member 17. The bearing member 17 is rigid with a guiding arm 18.

The guiding arm 18 is connected with the frame 10 by vertical pivot means 19 which allows the guiding arm 18 to swing horizontally.

The forward end portion of the guiding arm 18 is connected by ball and socket means 20 with a steering rod 21. The steering rod 21 is of adjustable length to provide for transversely adjusting the soil cultivating blade 12 toward and away from the frame 6. One way of providing for adjustment of the length of the steering rod 21 is to make said steering rod in two parts that relatively overlap and are provided with a plurality of registering holes or slots 22 and are adjustably secured together by bolts 23.

The end portion of the steering rod 21, shown at the right in Fig. 1, is connected by ball and socket joint means 24 with a steering arm extension 25. The steering arm extension 25 is connected by horizontal pivot means 26 with a special tractor steering arm 31 that replaces the usual steering arm of the tractor.

A cable 27, Figs. 1 and 3, is provided for lifting the front end portion of the grape hoe. This cable 27 has one end portion connected with the forward end of the main frame 6. From this point the cable 27 passes upwardly and rearwardly over a sheave 28 on a support 29 that is rigid with the tractor. The rear end portion of the cable 27 is connected with a lever 30 by which a pull may be exerted on said cable to lift the forward end portion of the grape hoe.

In Figs. 2 and 3 I show what I term a direct acting blade guiding means. In this form of the invention the special tractor steering arm 31 is directly connected with the blade carrying frame 10 by an extensible two part steering arm extension comprising relatively telescopic parts 32 and 33 and ball and socket joint means 34.

The connection of the ball and socket joint means 34 with the blade carrying frame 10 is preferably adjustable. This may be accomplished by providing a plurality of transversely spaced apart holes 35 in the frame 10. By means of these holes 35 a part 36 of the ball and socket joint means may be selectively connected with said frame in different positions.

Except for the blade guiding means the parts shown in Figs. 2 and 3 are similar to the parts shown in Fig. 1 and are correspondingly numbered.

Figs. 4 and 5 show a form of this invention in which my grape hoe is positioned between the front and rear wheels of a tractor and is operatively connected with the tractor so that the hoe will be propelled or moved by the tractor and the blade of said hoe will be steered by the tractor steering mechanism.

In Figs. 4 and 5 the parts which are similar to those shown in Figs. 1 to 3 and hereinbefore described are correspondingly numbered.

In said Figs. 4 and 5 the blade carrying frame 10 is supported by rollers 11 that are rotatively mounted on underslung frame members 40. The frame members 40 preferably extend between a front tractor axle 7 and a rear axle housing 41. A beam 13 that carries a soil cultivating blade 12 is connected by pivot means 42 with the blade carrying frame 10.

The blade carrying frame 10 is adjustably connected by ball and socket joint means 43 with a rod member 44 that fits telescopically into a bell crank shaped steering arm 45. The steering arm 45 is secured to an upright shaft 46. The shaft 46 is connected by suitable steering gear mechanism in housing means 47 with the steering post 48 of the tractor. By the means just described the blade 12 of Figs. 4 and 5 and blade carrying frame to which it is connected may be moved directly by the tractor steering mechanism in the same manner as the corresponding blade and blade carrying frame shown in Figs. 2 and 3.

A lever 49 is provided for lowering and raising the rear end portion of the beam 13, Figs. 4 and 5, to thereby raise and lower the blade 12.

Figs. 6, 7 and 8 show another embodiment of this invention in which grape hoe devices that are installed between the front and rear wheels of a tractor are connected by indirect guiding means with the tractor steering means.

In said Figs. 6 and 7 I show a structure in which a beam 13 that carries a soil cultivating blade 12 is secured to a vertically adjustable plate 50. The plate 50 is guided for vertical movement in guides 51 that are secured to a transversely movable blade supporting frame 10.

A disc 52, which corresponds to disc 16 of Fig. 1, is rotatively mounted on a horizontal bearing member 53. The bearing member 53 is supported by an upright post 54 that is mounted for oscillation in a bracket 55. The bracket 55 is rigidly secured to the vertically adjustable plate 50. A lever arm 56 is secured to the upper end portion of the post 54 and extends through a suitable opening in the vertically adjustable plate 50 and is connected by ball and socket joint means 57 with an operating link 58. The rear end portion of the link 58 is connected by ball and socket joint means 59 with one arm 60 of a steering lever. Another arm 61 of this steering lever is used for steering the front wheels of the tractor. Said steering lever comprising arms 60 and 61 is connected with the steering mechanism of the tractor in a manner described in connection with Figs. 4 and 5.

A lever 62 is provided for raising and lowering the plate 50 to raise and lower the blade 12.

Obviously movement of the steering mechanism shown in Figs. 6 and 7 will angularly move the cutter disc 52 and the movement of this disc 52 through the ground will move the soil cultivating blade 12 transversely of the tractor.

In all types of grape hoe herein disclosed the soil cultivating blade is connected with the steering mechanism of the tractor in such a manner that said blade will be guided and steered by operation of the tractor steering mechanism.

In the devices shown in Figs. 2, 3, 4 and 5 this steering or guiding of the soil cultivating blade 12 is transmitted directly frcm the steering arm of the tractor to the said blade 12.

In the devices shown in Figs. 1, 6 and 7 the operator uses the tractor steering means to steer the rolling disc or cutter and said rolling disc or cutter serves as a medium through which the power that guides the soil cultivating blade 12 is transmitted. Any shock or pull or vibration from the soil cultivating blade 12 is thus transmitted to the disc 16 in the Fig. 1 structure or to the disc 52 in the Fig. 6 structure, rather than being transmitted directly to the tractor steering mechanism.

When in use all types of this machine operate between the rows of grapes or like crop and the operator guides the soil cultivating blade 12 by manipulating the tractor steering mechanism. The soil cultivating blade 12 may be thus guided to sever or cover up the weeds in and along a row of grape vines or like crops and may be quickly and easily moved sidewise, toward the left, to avoid contact with the base portions of the grape vines or with the posts that are used to support said vines.

I have found that when the soil cultivating blade 12 is thus connected with the tractor steering mechanism, either directly as shown in Figs. 2, 3 and 4 or indirectly by means of the rolling disc, as shown in Figs. 1, 6 and 7, it is comparatively easy to guide said soil cultivating blade 12 in such a manner as to destroy most of the weeds in and along a row of grapes and, at the same time, keep said soil cultivating blade clear of the grape vines and trellises by which said vines are supported.

When the soil cultivating blade 12 is guided along a grape row, as above described, the tractor will respond to movements of the steering mechanism and will follow the row in the proper manner and the driver may give substantially all of his attention to steering or guiding the soil cultivating blade 12.

In the machines which use the rolling disc 16 as an indirect means for guiding the soil cultivating blade 12 the disc helps to withstand side draft which may be produced by the pressure of the soil against the blade 12. Also the rolling disc relieves the driver of a substantial amount of strain and effort that would otherwise be required in guiding the blade 12. When the grape hoe is not being used for cultivating and weeding purposes the blade 12 may be elevated so that it will be clear of the ground. The disc 16, Fig. 1, and the disc 52, Fig. 7, will be elevated along with the blade 12.

Obviously changes in my tractor propelled grape hoe may be made within the scope and spirit of the following claims.

Having described my invention what I claim is:

1. In a tractor propelled grape hoe adapted to be propelled by a tractor that has the usual steering mechanism, a soil cultivating blade, a rotating disc normally operable in the ground and connected with said blade for guiding said blade, and disc guiding means connecting said disc with the tractor steering mechanism.

2. In a tractor propelled grape hoe adapted to be connected with a tractor that has the usual tractor steering mechanism, frame means secured to the tractor, a platform supported by said frame means for movement transversely of the tractor, a soil cultivating blade carried by said platform, and means connecting said platform with the steering mechanism of the tractor for moving said platform in the same direction in which the tractor is steered by operation of said tractor steering mechanism.

3. A tractor propelled grape hoe adapted to be carried by a tractor, comprising a main frame secured to the tractor, rollers rotatively mounted on said main frame between the front and rear wheels of the tractor, a blade carrying frame supported by said rollers and floatingly movable horizontally between the front and rear wheels of the tractor in directions at substantially right angles to the length of the tractor, a soil cultivating blade carried by said blade carrying frame, and frame moving means connected with said blade carrying frame and operable from the tractor.

4. A tractor propelled grape hoe adapted to be pushed by a tractor, comprising a main frame having its rear end portion pivotally connected with the tractor, wheel means carrying the front end portion of said main frame, a horizontal blade carrying frame supported by said main frame and floatingly movable in directions at substantially right angles to the length of the tractor, a soil cultivating blade carried by said blade carrying frame, and frame moving means connecting said blade carrying frame with the steering mechanism of the tractor.

5. A tractor propelled grape hoe adapted to be connected with a tractor, comprising a blade carrying frame movable longitudinally with the tractor and floatingly movable in directions at substantially right angles to the length of the tractor, a soil cultivating blade carried by said frame, a rotatable disc carried by said frame and adapted to cut into the ground when the grape hoe is in operation to position said blade carrying frame in different positions transversely of the tractor, and disc guiding means connecting said disc with the steering mechanism of the tractor.

6. A tractor propelled grape hoe adapted to be pushed by a tractor, comprising a main frame, horizontal pivot means connecting said main frame with the front axle of the tractor, caster wheels supporting the forward end portion of said main frame, a blade carrying frame carried by said main frame and adjustably movable transversely of said main frame, a soil cultivating blade carried by said blade carrying frame, and blade guiding means connected with said blade carrying frame and operable from said tractor to move said blade carrying frame transversely of said main frame.

7. A tractor propelled grape hoe adapted to be pushed by a tractor comprising a main frame, horizontal pivot means connecting said main frame with the front axle of the tractor, caster wheels supporting the forward end portion of said main frame when the grape hoe is in operation, hoisting means connected with said main frame and operable from the tractor to hoist the forward end portion of said main frame, a blade carrying frame carried by said main frame and adjustably movable transversely of said main frame, a soil cultivating blade carried by said blade carrying frame, and blade guiding means connected with said blade carrying frame and operable from the tractor to move said blade carrying frame transversely of said main frame.

8. A tractor propelled grape hoe adapted to be pushed by a tractor, comprising a main frame, horizontal pivot means connecting said main frame with the front axle of the tractor, caster wheels adapted to support the forward end portion of said main frame, a blade carrying frame carried by said main frame and adjustably movable transversely of said main frame, a soil cultivating blade carried by said blade carrying frame, a rotatable disc carried by said blade carrying frame and adapted to cut into the ground when the grape hoe is in operation, said disc controlling the transverse adjustment of said blade carrying frame relative to said main frame, and disc guiding means connecting said disc with the steering mechanism of the tractor.

9. A tractor propelled grape hoe adapted to be pushed by a tractor, comprising a main frame having its rear end portion pivotally connected with the tractor, wheel means carrying the front end portion of said main frame, rollers mounted on vertical axes on said main frame, a blade carrying frame supported by said rollers and floatingly movable in directions generally transverse to the length of the tractor, a soil cultivating blade carried by said blade carrying frame, frame moving means connected with said blade carrying frame and operable from the tractor, and adjusting means provided in connection with said frame moving means.

10. A tractor propelled grape hoe adapted to be pushed by a tractor which has steering means including a steering arm mounted on a vertical pivot, comprising a main frame having its rear end portion pivotally connected with the front axle of the tractor, wheels supporting the front end of said main frame, rollers mounted on vertical axes on said main frame, a blade carrying frame supported by said rollers and floatingly movable in directions at substantially right angles to the length of the tractor, a soil cultivating blade carried by said blade carrying frame, a forwardly extending lever arm secured to the tractor steering arm, and an adjustable link operatively connected with said lever arm and said blade carrying frame for moving said blade carrying frame transversely relative to said main frame.

11. A tractor propelled grape hoe adapted to be pushed by a tractor which has steering means including a steering arm mounted on a vertical pivot, comprising a main frame supported in front of the tractor, rollers rotatively mounted on said main frame, a blade carrying frame supported by said rollers and floatingly movable in directions at substantially right angles to the length of the tractor, a soil cultivating blade carried by said blade carrying frame, a rotatable disc pivotally mounted by upright pivot means on said blade carrying frame and adapted to cut into the ground when the grape hoe is in operation, said disc controlling relative transverse movement between said two frames, a lever member connected with said disc, a forwardly extending lever arm secured to said tractor steering arm, a link connecting said lever member and said lever arm, and means for relatively adjusting the distance between the points of connection of said link with said levers.

12. In a tractor propelled grape hoe adapted to be connected with a tractor that has the usual tractor steering mechanism, frame means secured to the tractor, a platform supported for transverse movement by said frame means, other frame means supported for vertical adjustment by said platform and positioned at one side of said platform, means operable to vertically adjust said other frame means, a soil cultivating blade carried by said other frame means, and devices connected with the steering mechanism of the tractor and operable to move said platform transversely of the tractor.

ERNEST BEST.

REFERENCES CITED

The following references are of record in the file of this patent:

UNITED STATES PATENTS

| Number | Name | Date |
| --- | --- | --- |
| 655,375 | Scanlon | Aug. 7, 1900 |
| 816,418 | Anderson | Mar. 27, 1906 |
| 1,449,139 | Bartholomew | Mar. 20, 1923 |
| 1,718,773 | Benjamin | June 25, 1929 |
| 1,977,273 | Hansen | Oct. 16, 1934 |